Jan. 29, 1924.
T. MIDGLEY
1,481,850
CONTRACTIBLE TIRE BUILDING FORMER
Filed Sept. 21, 1922   2 Sheets-Sheet 1
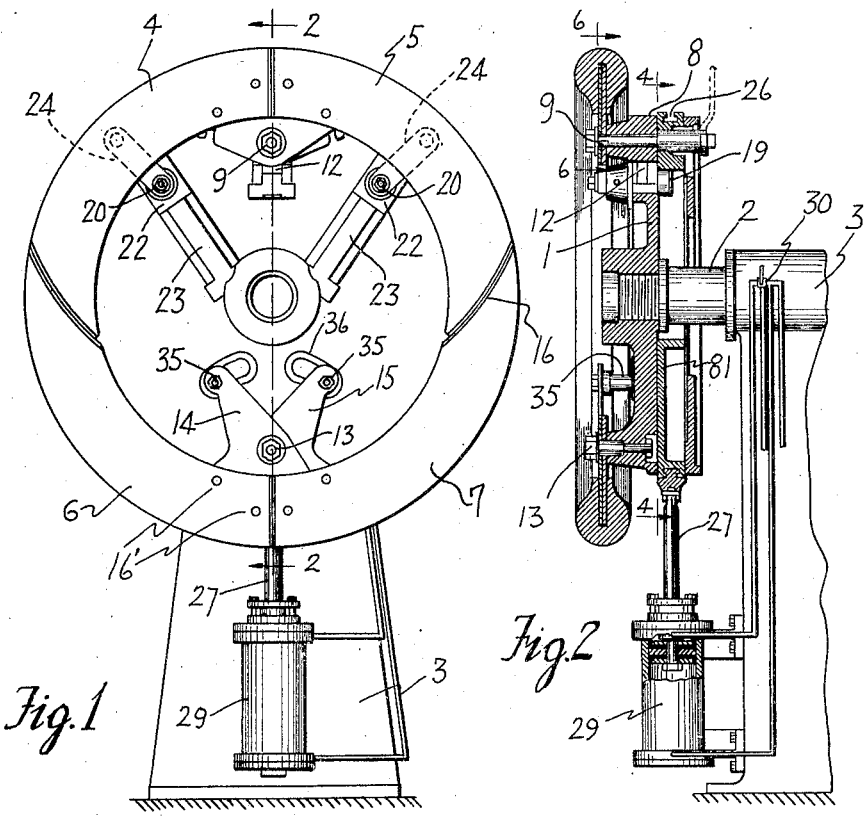
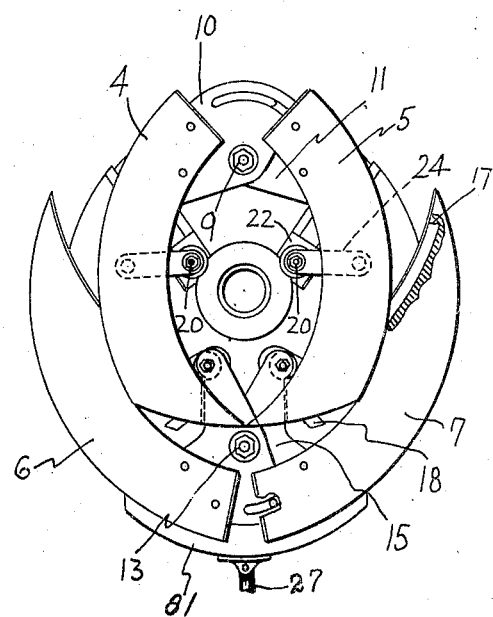
INVENTOR
Thomas Midgley
BY Edward C. Taylor
ATTORNEY Jan. 29, 1924.
T. MIDGLEY
1,481,850
CONTRACTIBLE TIRE BUILDING FORMER
Filed Sept. 21, 1922    2 Sheets-Sheet 2
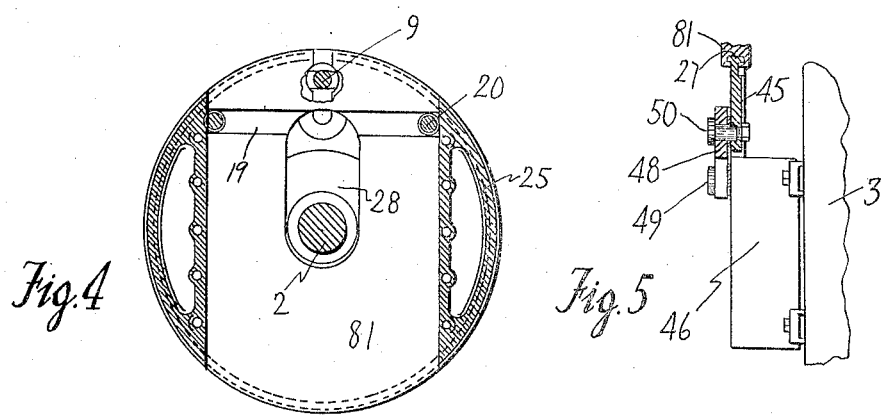
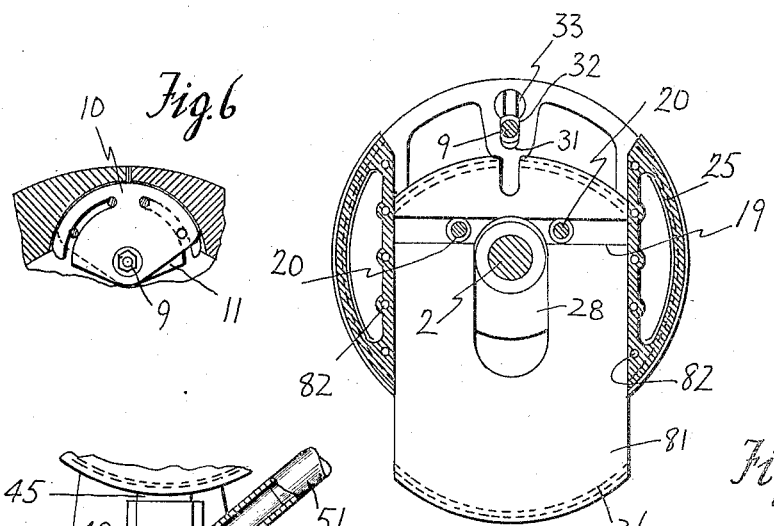
INVENTOR
Thomas Midgley
BY Edward C. Taylor
ATTORNEY Patented Jan. 29, 1924.

1,481,850

UNITED STATES PATENT OFFICE.

THOMAS MIDGLEY, OF HAMPDEN, MASSACHUSETTS, ASSIGNOR TO THE FISK RUBBER COMPANY, OF CHICOPEE FALLS, MASSACHUSETTS, A CORPORATION OF MASSACHUSETTS.

CONTRACTIBLE TIRE-BUILDING FORMER.

Application filed September 21, 1922. Serial No. 589,669.

*To all whom it may concern:*

Be it known that I, THOMAS MIDGLEY, a citizen of the United States of America, residing at Hampden, in the county of Hampden and State of Massachusetts, have invented certain new and useful Improvements in a Contractible Tire-Building Former, of which the following is a specification.

This invention relates to an improved contractible tire building former or core. Contractible tire building formers, including means to manipulate the sections, have heretofore been used in the manufacture of bicycle tires as well as automobile tires. Broadly, they are very old, as the patented art shows.

The same type of contractible former long used for bicycle tires can be used for building automobile tires except when the difference in tire size makes this impossible. The difficulty as the tire size increases is found in getting the finished tire off the contracted former or in putting the building former in the tire for vulcanizing operations. In the larger size tires the proportion of the outer tire periphery to the inextensible bead or inner tire periphery is such that the sections of the tire former cannot, according to prior art structures, be sufficiently nested in one plane by the manipulating means to permit the tire to be taken off the former. Due to this objection, other inventors have made contractible formers so that some of the sections are movable out of the plane of the other sections and by this shifting operation the remaining sections can be nested in the plane of a tire and within a space to permit the tire to be removed or the sections inserted. Examples of this arrangement are shown in the Denmire Patent No. 1,399,936, and in the Doughty Patent No. 1,101,732.

The prime object of this invention is to provide an improved contractible tire building former or core with means to position the sections so that large tires can be put on and taken off the core without shifting any of the core sections out of the core plane. Stated another way, according to a principal feature of this invention, the core sections and means to position them are made in such a way that the sections can all be nested in the same plane by an additional degree of contraction, whereby a contractible former can be used with larger sized tires in a more convenient manner than heretofore.

Other objects of the invention are: to provide a prime mover for all the work of positioning the core sections in one plane; to provide improved co-ordinating details of a contractible core to accomplish more efficiently the general and specific objects of a structure of this character.

The invention will be best understood by reference to the accompanying drawings and detailed description. Referring to the drawings:

Fig. 1 is a front elevation of the improved contractible core in expanded position;

Fig. 2 is a sectional view on the plane of line 2—2, Fig. 1;

Fig. 3 is a plan view of the contractible core shown in Fig. 1 but with the sections in contracted or nested position;

Fig. 4 is a sectional detail view showing the cam slide and its support taken on line 4—4, Fig. 2;

Fig. 5 is a sectional detail view of the parts shown in Fig. 8;

Fig. 6 is a detail sectional view taken on line 6—6 of Fig. 2;

Fig. 7 is a detail view similar to Fig. 4 but showing the cam slide in another position; and Fig. 8 is a detail view showing a modified device for operating the cam slide.

The tire core is shown in side elevation in Fig. 1 and in section in Fig. 2. The function of the mechanism shown with the core is to move the sections from the positions shown in Fig. 1 to those shown in Fig. 3 and back again. If a tire has been built upon the core and it is desired to take it off the core, the core sections will need to be contracted within a space sufficiently small to permit the bead diameter of the tire to be moved over the sections. The bead diameter of a tire built on the core shown would be substantially the diameter of the inner periphery of the core in Fig. 1. In large size tires the external periphery in proportion to the bead periphery of the tire is such that the core sections which occupy the space between these peripheries in the building of the tire are so large that they cannot ordinarily be nested in the same plane.

Referring to Fig. 1, the general operation is to turn sections 4 and 5 about the shaft 9 to contract these sections, and to turn sections 6 and 7 about pivot rod 13. Either during these pivotal movements or afterwards, the shaft 9 is moved radially towards the center so as to cause the contracted sections 4 and 5 to move into closer nested relation with sections 6 and 7 as indicated in Fig. 3. The core is expanded by the reversal of these movements.

With this general operation in mind, the details of the mechanism for accomplishing it will be explained.

Core sections 4 and 5 are supported from a disc 1 mounted on the end of a shaft 2 which is mounted in suitable bearings in the standard 3 so as to support the disc for rotation. During the operation of contracting or expanding the core sections according to this invention, the shaft 2 is stationary. The core sections 4 and 5 are movably connected to the disc support. Disc 1 holds a bearing 8 mounted in a radial slide 12 on the disc for limited radial movement. A stud shaft 9 is mounted in bearing 8. At the outer end of shaft 9, plates 10 and 11 are pivoted. These plates are pinned as indicated in Fig. 3 to the core sections 4 and 5 respectively. At the inner end of the shaft 9 is a cam lock arrangement which will be later described.

Core sections 7 and 8 are supported from disc 1. The disc has an integral bearing for pivot rod 13. Plates 14 and 15 are mounted on this pivot and pinned as indicated at 16' to core sections 6 and 7. These plates extend beyond their pivot rod 13 and each is provided at its outer end with a roll on a stud 35 which enters a guide slot 36 in disc 1.

The outer abutting ends (as at 16) of sections 4, 5, 6, and 7 have co-operating pins 18 and shoulders 17 to limit the outward pivotal movements of the sections and to hold them in circumferential alignment. The shoulders 17 are on sections 6 and 7 at the outer ends of slots which permit movement of the pins 18 in sections 4 and 5 up to abutting and aligned position. This position is shown in Fig. 1 where it is shown that the core is made circumferentially complete by its four aligned and abutting sections.

Back of disc 1 is a cam slide support 25 of circular form with vertical ways for receiving cam slide 81. The ends of the slide in its upper position are circumferentially aligned with its support (Fig. 4) so as to form a disc in this position. The edges of the slide and its support when in disc form have a circumferentially aligned T slot or groove 26 by which a co-operating head pivoted to the top of a bar 27 may operate the cam slide. The slide and its support are rotatable with the disc 1 and the T head of bar 27 is in engagement with its corresponding slot 26 throughout said rotation.

The cam slide has a cross slot 19 to receive the two rolls on the ends of stud shafts 20 which may travel towards and away from each other as the cam slide is moved in its support. A longitudinal slot 28 straddling shaft 2 permits this movement of the cam slide.

The stud shafts 20 are mounted one on each of slides 22. These slides are mounted to move in suitable ways 23 provided on the disc 1 (Fig. 1). As shown, these ways 23 converge inwardly on the disc 1 to restrict the movements of slides 22. The stud shaft 9 on which core sections 4 and 5 are pivoted is arranged to lock its bearing 8 in its upper position (Fig. 2). The shaft extends through opening 33 in the cam slide support 25. A radial slot 31 enters opening 33 (Fig. 7). Oppositively disposed flattened portions 32 on shaft 9 permit it when properly turned to enter slot 31. Otherwise shaft 9 is held in opening 33. When core sections 4 and 5 are expanded into the aligned positions of Fig. 1, shaft 9 is aligned with opening 33 and the bearing 8 is in the upper position within its ways 12. A wrench on the inner end of shaft 9 as indicated in Fig. 2 may turn the shaft and lock it on the cam support in opening 33 which embraces it. The flattened portions of the shaft extend at this time crosswise of the opening to slot 31. This will be clear from a comparison of Figs. 4 and 7. When the cam slide 81 is in its upper or aligned position with its support, then shaft 9 and the parts connected therewith are in their expanded position, held there by engagement of shaft 9 with the cam slide support.

The bar 27 is shown in Figs. 1 and 2 for power operation by the piston in cylinder 29. Suitable connections are made to the cylinder on opposite sides of the piston and to a common valve 30 connecting to sources of fluid pressure and exhaust. These are indicated so that it is clear that valve 30 may control the up and down movement of bar 27 connected to the piston, as is well understood.

A modification is shown in Figs. 5 and 8. The bar 45 of the modification has a head the full equivalent of bar 27 to engage the cam slide for operation. This bar 45 is mounted to move in ways 46 fastened to the frame standard 3. A lever 48 is pivoted at 49 to a frame bracket. A stud 50 extends from bar 45 through a slot in lever 48, as clear from the drawings. Any suitable length handle 51 may connect with lever 48. By such handle and power multiplying means the bar 45 can be raised and lowered.

The particular apparatus illustrated is operated as follows: With the parts as in Figs. 1 and 2, shaft 9 is unlocked so that it may enter slot 31. Bar 27 is forced downwardly by the piston or lever movement. the T head 27 moves cam slide 81 with it. The cam pulls both stud shafts 20 down. The slides 22 working in ways 23 (which also operate as cams) move stud shafts 20 inwardly. The core sections 4 and 5 are each connected to its adjacent stud shaft 20 by a pivoted lever 24 which swings from a pivot within its core section extending out between the planes of the bead lines of the core. Therefore the movement of shafts 20 from the position of Fig. 1 to that of Fig. 3 pulls the core sections 4 and 5 about their shaft 9 until their ends approach very closely and within the nesting plane. The cam slide in this movement has caused the studs 20 to move from the position of Fig. 4 to approximately that of Fig. 7 and the ways 23 and the cross slot 19 (engaging above and below the rolls on the ends of the studs) have made this movement possible and easy.

During the movement of the core sections 4 and 5 to their collapsed position, the ways 23 have acted on slides 22 as a cam by which the core sections are moved downwardly as well as inwardly. The design of the operating parts is such (and is so indicated in the drawings) that core sections 4 and 5 as they collapse pull their supporting stud 9 radially. This is rendered both possible and easy by the bearing of stud 9 moving in ways 12 as the inner end of the stud enters slot 31 of the cam slide support. The latter is suitably bolted to the disc 1 by bolts 82 indicated in Figs. 4 and 7, but not otherwise shown. Thus the movements described are with relation to both the disc 1 and the cam slide support.

The core sections 4 and 5 are preferably moved, as described, towards their collapsed position before sections 6 and 7 start to move. But when they have moved enough to clear the inner ends of sections 6 and 7 they engage the rolls on the ends of studs 35. Further movement causes each section 4 and 5 to move its corresponding section 6 and 7. This is because core sections 6 and 7 are carried by the plates or levers 14 and 15 pivoted at 13 to disc 1 and provided with said studs 35 at their outer ends. The inner ends of the levers are pinned to their corresponding core sections and extend outwardly from between the bead lines of the sections. Each plate is provided with a slot so as to straddle the fastening pins of its adjacent plate. (This structure is like that shown in Fig. 6).

Therefore the movement of core sections 4 and 5 causes the movement of core sections 6 and 7 from the positions in Fig. 1 to those in Fig. 3.

It is desirable to cut slots in the ends of sections 4 and 5 between the bead lines of said sections so that they may straddle plates or levers 14 and 15 in the position of the parts in Fig. 3.

The core sections are expanded from their collapsed position of Fig. 3 to the expanded position of Fig. 1 by lifting bar 27 and thus reversing the movements already described. The start and finish of the operations take place when the cam slide support as shown is in vertical position.

The pins 18 in sections 4 and 5 enter the slots in sections 6 and 7 to finally abut against shoulders 17 when the core sections are aligned circumferentially.

From the foregoing description it is clear what a general or specific embodiment of the invention will accomplish. The claims are intended to cover the broad and general features as well as the specific features of the invention found in the illustrative embodiment of the invention.

Having thus described my invention, I claim:

1. A contractible former of the character described comprising circumferentially alignable sections, supporting means therefor, pivots connecting said sections with the supporting means for movement in a single plane only, and operating means to swing said sections about their pivots from and to contracted positions, including means to move one of said pivots to increase the degree of contraction of said sections in said single plane.

2. A contractible support for tire building comprising two pairs of circumferentially alignable sections, a pivotal support for each pair of sections, means to move the sections about their supports and to move one of said supports towards the other.

3. A complete sectional core or former of toric shape, and mechanism to nest the sections in one plane comprising pivotal connections between pairs of said sections, and power multiplying means to turn the sections about their pivotal connections and to cause the pivots to come closer together.

4. A contractible tire building core comprising a support, a complete series of core sections pivoted on the support, mechanism on the support operable to closely nest said sections in the plane of the complete core, including means to turn the sections about their pivotal supports and then move one of the pivotal supports towards the center of the core.

5. A tire building support of the character described comprising in combination a complete tire core of four approximately equal sections, an arm pinned to each section and pivotally mounted on the support, the arms for one pair of sections arranged diametrically opposite the arms of the other pair of sections, the abutting ends of each pair of sections remote from said arms lying in a circumference struck from one of the pivots on the support, and means on the support to swing one pair of sections together from said last named pivot, to swing the other pair when the ends of the first pair have cleared, and to move the first pair of sections towards the center of the core plane to cause the ends of the core sections to overlap to a greater degree.

6. A tire building support comprising a sectional core, a support arranged in a plane parallel to and adjacent the core, pivotal connections between the support and the core sections, and mechanism operable on said pivotal connections to contract and expand the core in one plane.

7. A tire building support comprising a sectional core, a support arranged in a plane adjacent the core, at least one pivotal connection between the support and each of the core sections, and cam mechanism operably connected to each of said pivotal connections and operable to expand and contract said core in one plane.

8. A tire building support comprising a core of four sections, a support to which each of the sections is pivoted, cam mechanism operable to force two adjacent sections together about their pivot, and means engageable by said sections to move the other two sections to turn on their pivot and close upon the first two sections.

9. A tire building support comprising a core of four sections, a support to which each of the sections is pivoted, cam mechanism operable to force two adjacent sections together about their pivot and means engageable by said sections to move the other two sections to turn on their pivot and close upon the first two sections, said cam mechanism including means to move said first two sections and their pivotal support bodily into close nesting relation to the other two sections.

10. A tire building support comprising a rotatable disc support thereon, two diametrically opposed stud shafts extending from the support, a bearing for one of said shafts slidable radially on the support, a four section tire core, pivot plates or arms one fastened to each section and mounted in pairs on said stud shafts, two diverging radial guides in said support, two pivot arms one for each of said guides and pivotally connecting the guide and one of the sections connected to said radially movable stud shaft, a cam plate slidably mounted in said support having cam surfaces engaging said diverging guides and power multiplying means to move said cam plate, all for the purpose described.

THOMAS MIDGLEY.